United States Patent [19]
Jansen et al.

[11] Patent Number: 5,843,392
[45] Date of Patent: Dec. 1, 1998

[54] CATALYST SYSTEM OF THE STRUCTURED TYPE

[75] Inventors: Jacobus Cornelis Jansen; Colette Henriette Legein, both of Delft; Hans Peter Alexander Galis, Nootdorp; Henk Van Bekkum, Vlaardingen; Albert Willem Gerritsen, Delft; Cornelis Maria van den Bleek, Nootdorp, all of Netherlands

[73] Assignee: Technische Universiteit Delft, Delft, Netherlands

[21] Appl. No.: 432,157

[22] PCT Filed: Nov. 5, 1993

[86] PCT No.: PCT/NL93/00234

§ 371 Date: Jul. 21, 1995

§ 102(e) Date: Jul. 21, 1995

[87] PCT Pub. No.: WO94/19902

PCT Pub. Date: May 11, 1994

[30] Foreign Application Priority Data

Nov. 5, 1992 [NL] Netherlands ............................. 9201940

[51] Int. Cl.$^6$ ........................................................ B01J 8/00

[52] U.S. Cl. ............................. 423/239.2; 502/74; 502/77
[58] Field of Search .................................. 502/64, 66, 71, 502/74, 77, 4; 423/709, 239.2

[56] References Cited

U.S. PATENT DOCUMENTS 5,266,542  11/1993  Hashimoto et al ........................ 502/64
5,310,714   5/1994  Grasseli et al. ............................ 502/64

FOREIGN PATENT DOCUMENTS 9000454  9/1991  Netherlands .
9213631  8/1992  WIPO .

*Primary Examiner*—Michael Lewis
*Assistant Examiner*—Thomas G. Dunn, Jr.
*Attorney, Agent, or Firm*—Michaelson & Wallace; Peter L. Michaelson; Edward M. Fink

[57] ABSTRACT

A catalyst system of the structured type is described wherein a structured support is covered with a layer of molecular sieve crystals having substantially the same orientation relative to the support surface. Also disclosed is a reactor in which the catalyst system may be disposed and a method for the selective reduction of nitrogen oxides utilizing a compound comprising a NH group.

13 Claims, 2 Drawing Sheets

CATALYST SYSTEM OF THE STRUCTURED TYPE

BACKGROUND OF THE INVENTION

1. Field of the Invention

This invention relates to a catalyst system of the structured type, to a reactor provided with a structured reactor packing and to a method for the selective reduction of nitrogen oxides, utilizing a compound comprising a NH group in the presence of such catalyst system.

2. Description of the Prior Art

Dutch Patent Application 9000454 discloses a method of producing a reactor packing, in which solids particles are connected with each other by connecting means, and in which the individual solids particles locally surround the connecting means completely. A reactor packing of this type possesses a low pressure drop, a relatively small volume and a relatively large active surface. The external surface of all solids particles comes into direct contact with a fluid to be treated.

The solids particles can be attached to the connecting means in many ways. For instance, solids beads can be strung on a threadlike connecting means. Preferably, however, the solids particles are applied to the connecting means by extrusion or precipitation.

The solids particles can be catalytically active themselves, but it is also possible to use support material particles which, after being interconnected, are provided with catalytically active material. Incidentally, none of these possible methods is specifically elucidated in the patent application referred to.

SUMMARY OF THE INVENTION

It has now been found that when molecular sieve crystals are grown in particular orientations on a suitable structured support, catalyst systems with very favorable properties are obtained. More particularly, according to the invention, catalyst systems are obtained which are very suitable for carrying out selective chemical reactions, for instance the reduction of nitrogen oxides.

The catalyst system of the structured type is characterized, according to the invention, in that a structured support is covered with a layer of molecular sieve crystals and/or modifications thereof, which posses substantially the same orientation relative to the support surface.

The catalyst system according to the invention is covered with substantially one layer of molecular sieve crystals and/or modifications thereof which are directly chemically bound to the structured support. It is essential to the invention that the sieve crystals be grown directly on the support surface. Accordingly, the sieve crystals are not fixedly bonded or glued to the support surface by means of other joints.

The layer of sieve crystals is not continuous. The point is that it is necessary that the main faces of these molecular sieve crystals be accessible to substances which are to be converted under the influence of the catalyst system according to the invention.

BRIEF DESCRIPTION OF THE DRAWING

The invention will be more readily understood by reference to the following detailed description taken in conjunction with the accompanying drawing wherein.

DESCRIPTION OF THE PREFERRED EMBODIMENTS

Figure 1:
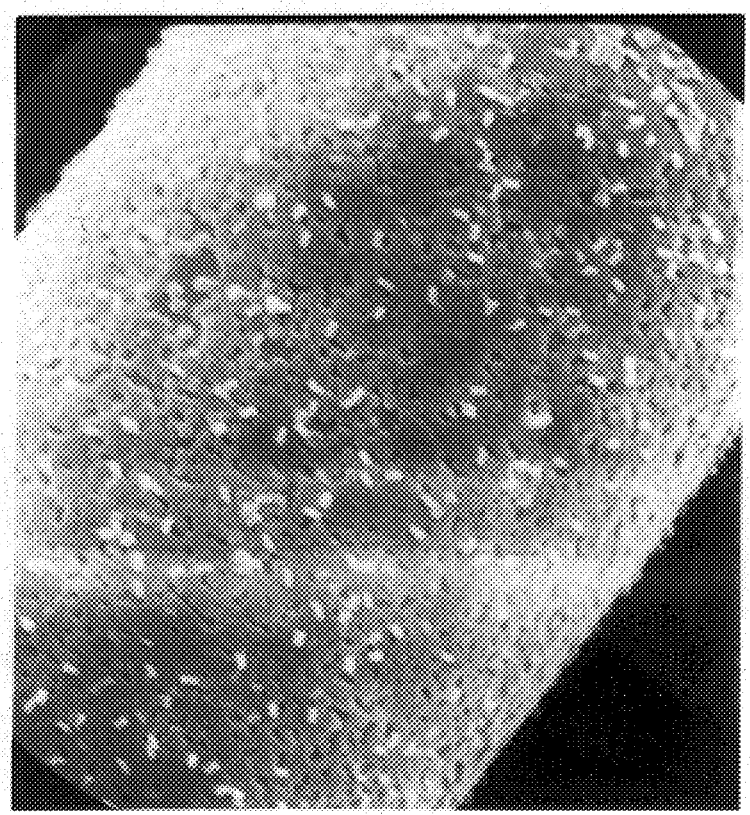
FIG. 1. is an electron microscope photograph of a coated gauze prepared in accordance with the invention.

Although preferably all molecular sieve crystals are chemically bound to the surface, it is also possible that one or more layers of sieve crystals are deposited on the chemically bound layer of sieve crystals. In that case, however, it is necessary that sufficient open pore space is available in the direction of the support, so that the compounds to be converted can come into contact with the active sieve crystal surfaces to a sufficient degree.

By the expression "substantially the same orientation" is meant that anisotropically formed sieve molecule crystals are, for an important part, arranged in a particular direction relative to the support surface. Since pores have to present between the molecular sieve crystals, these crystals are preferably not be grown on the support surface in flat orientation.

International Patent Application WO-92/00029 discloses an inorganic composite membrane comprising molecular sieve crystals. This membrane comprises a macroporous support on which molecular sieve crystals are provided substantially as a monolayer and oriented such that, to an important extent, the pores of the sieve crystals form a significant included angle with the support surface. The membranes described are utilized in the physical separation of mixtures, for instance gas and/or vapor mixtures. The sieve function of the molecular sieve crystals is essential to the membrane action and accordingly determines the included angle which the pores are to form with the porous support surface. In the international application referred to it is not suggested in any way that molecular sieve crystals which are applied in a specific orientation relative to a support, whereby the catalyst system formed possesses a large active surface, are very suitable for carrying out a selective chemical reaction.

Molecular sieve crystals can possess a one-, a two- and a three-dimensional pore structure. In the catalyst systems according to the invention, the morphology in conjunction with the particle size of the sieve crystals is of great importance.

In the case where the pores are present in three main directions of the sieve crystal, mainly the particle size is of great importance. Very small crystals cannot all of them be easily brought into the proper orientation relative to the support. For such crystals to be arranged on the structured surface in the proper orientation, they must have dimensions of at least 10 $\mu$m.

When the pores of a particular type of molecular sieve extend in two directions or in one direction only, the crystals must be oriented very specifically relative to the substrate surface so as to obtain a catalyst system as active as possible. With reference to the above-mentioned International Patent Application WO-92/00029, it is observed that it was found that it is possible for molecular sieve crystals with these pore structures to be crystallized out in a flat form, with pores extending in the direction of the smallest dimension.

The molecular sieve crystals and modifications thereof that are preferably utilized in the catalyst system according to the invention possess a two-dimensional pore structure.

More particularly, very favorable results are obtained if the molecular sieve crystals and modifications thereof are of the type ZSM-5 and/or silicalite.

Sieve crystals in the form of flat crystals are preferably oriented such that they are arranged substantially perpendicularly to the support surface. This is to say that the angle between the support surface and the main direction of the majority of these flat crystals is greater than 45°. If the substrate is threadlike, it is possible in such case to speak of radially arranged sieve crystals.

Depending on the intended use, the molecular sieve crystals and modifications thereof typically undergo an ion exchange with a transition metal. In particular, very active catalyst systems are obtained if the molecular sieve crystals and modifications thereof are copper-, iron-, vanadium- or titanium-exchanged molecular sieve crystals.

The structured support that is used in the system according to the invention can, in principle, have all possible forms as described in Dutch Patent Application 9000454. Preferably, however, the support is gauzelike.

The structured support can essentially be of any material on which sieve crystals can be grown, in such a manner that they are chemically bound. The support material need not be catalytically active itself, since the support is substantially completely coated with catalytically active substances. It may sometimes be advantageous to choose as a support material a material with a high coefficient of heat conductivity. A catalyst system comprising such support can be heated or cooled as desired. This is advantageous in particular if the catalyst system according to the invention is used in a large reactor.

The structured support is normally formed from an inert material. Preferably, the structured support consists of a shaped metal or a shaped oxide material. More particularly, the structured support consists essentially of stainless steel, with very favorable results being obtained if the support is of the "fine grade" type of stainless steel.

There is a large variety of natural and synthetic molecular sieve molecules. Each type has a specific pore structure and often there are differences in the chemical composition of the different types. It is known to the skilled worker how he can influence the morphology and size of the sieve crystals.

Catalyst systems according to the invention, in which the molecular sieve crystals are arranged substantially perpendicularly to the surface, can for instance be obtained in the following manner.

A suitable substrate, for instance a gauze of stainless steel, is thoroughly cleaned. This can be effected by immersing the gauze in a suitable cleaning agent, such as boiling ethanol. Subsequently for a number of hours and at elevated temperature, for instance for 3–24 hours at 170° C., this substrate is contacted with an aqueous mixture with a silicon oxide content of at least approximately 0.1 mol/l, whilst the silicon to aluminum ratio in this solution is greater than approximately 50 and the concentration of sodium ions is greater than approximately 0.1 mol/l. In the process, nucleation of sieve crystals on the support surface takes place. At a sufficiently high nutrient concentration, i.e., a $SiO_2$ concentration greater than approximately 0.1 mol/l, those seeds whose fastest-growing crystal orientation is directed substantially perpendicularly to the surface, grow out fastest. This growth determined by diffusion processes yields a non-continuous but closely superposed layer of crystals on the support, resulting in a catalyst system with a maximum external surface and a maximum number of pore openings of the molecular sieve molecules, which catalyst systems are very suitable to be exposed to gaseous starting products.

If the silicon to aluminum ratio and the sodium concentration in the crystallization solution are lower than the above-specified values, a higher measure of lateral growth will take place.

The present invention further relates to a reactor provided with a structured reactor packing, which reactor is characterized in that the reactor packing is a catalyst system according to the invention. In principle, any suitable reactor housing, or also an exhaust of a combustion motor, can be used. In a suitable reactor housing, the structured catalyst systems according to the invention can be suspended or clamped. For instance, gauzelike catalyst systems can be clamped side by side in parallel relationship. Such reactors have a low pressure drop, have a relatively small volume and a relatively large active surface.

Finally, the present invention relates to a method for the selective reduction of nitrogen oxides, utilizing a compound comprising a NH group. This method is characterized, according to the invention, in that a nitrogen oxides-containing gas is reduced in the presence of a catalyst system or in the reactor according to the invention.

In a preferred embodiment, a catalyst system is used in which the molecular sieve crystals and/or modifications thereof are copper-, iron-, vanadium- or titanium-exchanged molecular sieve crystals of the type ZSM-5. Most preferably, the structured support consists essentially of stainless steel.

A method for the selective reduction of nitrogen oxides utilizing a compound comprising a NH group is known per se from Dutch Patent Application 9000053, describing the removal of $NO_x$ from combustion gases. This method comprises contacting a combustion gas with a compound comprising NH groups at increased temperature (75°–140°0 C.), followed by contacting the thus treated combustion gas with a metal catalyst in a second step. The compound comprising NH groups can for instance be urea, melamine, ammonia and the like. As a metal catalyst in the second step, preferably palladium or vanadium oxide on a suitable support is used.

Surprisingly, it has now been found that if a catalyst system according to the invention is used, a reduction of nitrogen oxides is obtained comparable to that obtained by the use of a known $V/Ti/SiO_2$ catalyst as described in European Patent Applications 0 265 590 and 0 217 446.

The invention will now be further explained in and by the following examples.

Example 1

Gauze of stainless steel (AISI 316) with 35 $\mu$m wires and a mesh of 44 $\mu$m (Miko Metaalhandel The Hague, prod. No. 100 ) was used as support for sieve crystals. This gauze, composed of 0.08% carbon, 1% silicon, 2% manganese, 2% molybdenum, 11.5% nickel, 17% chromium and the balance of iron, has a surface of substantially $Cr_2O_3$, on which the sieve crystals were crystallized. To carry out the crystallization, the gauze was cut to the desired dimensions and rolled up so that it fitted in the crystallization autoclave and in the reactor. As crystallization autoclave, a standard stainless steel autoclave is used with a Teflon internal coating. Subsequently, the support was thoroughly cleaned by immersion in boiling ethanol for 1 hour, so as to remove impurities which were present at the surface. Thereafter the support was dried at high temperature (approximately 120° C.) for 2 hours. This high temperature caused an increased chromium diffusion to the cut ends of the gauze, which chromium oxidized to chromium oxide, so that a completely continuous chromium oxide layer was obtained again.

Example 2

Metal-supported ZSM-5 crystals were synthesized by means of hydrothermal synthesis in a diluted aqueous solution containing: 1.6 mole units tetraethyl orthosilicate ($M_w$= 208.33 u; 98%; Janssen Chimica), 1 mole unit tetrapropylammonium hydroxide ($M_w$=203.37 u; 40%; Chemische Fabriek Zaltbommel) and 0.015 mole units sodium aluminate ($M_w$ 1.97 u; 95%; Riedel de Haen AG) in 626 mole units of water. This synthesis mixture was agitated overnight so as to obtain a homogeneous mixture.

Example 3

A rolled up piece of metal gauze which had been treated as in Example 1 was brought into a vertical position in a Teflon-coated autoclave. Then the homogeneous mixture according to Example 2 was poured into the autoclave. The filled autoclave was placed in an oven, where it was heated for 8 hours at 170° C. so as to effect crystallization on the metal support.

After the crystallization, the deposited ZSM-5 crystals were calcined by heating the catalyst system for 10 hours at 500° C. in a programmable oven (Carbolite Furnaces™). The oven was programmed as follows: heating to 80° C. at a rate of 1° C./min; maintaining at 80° C. for 1 hour; heating to 500° C. at a rate of 1° C./min; maintaining at 500°0 C. for 10 hours; cooling to room temperature at a rate of 1° C./min.

The calcined catalyst system obtained was subjected to repeated ion exchange in a 0.017M solution of copper(II) acetate. For that purpose, the gauze coated with the ZSM-5 crystals was placed for 4×24 hours in an always fresh solution of copper acetate, which solution remained in motion by the use of a magnet agitator.

The coated gauzes were analyzed with scanning electron microscopy (SEM) and element analysis, while the pore system was characterized by means of $N_2$-adsorption.

The electron microscope photographs were taken with a JEOL JSM-35 microscope. For that purpose, a piece of gauze was provided with a thin layer of gold. FIG. 1 shows an electron microscope photograph of the catalyst system obtained.

Element analysis of the ZSM-5 samples was carried out with ICP-AES (Induced coupled plasma atomic mission spectroscopy). The supported sieve molecule samples were immersed for 70 hours in a 1N NaOH solution to which a little ammonia had been added. Under these circumstances the zeolite crystals dissolved completely, whilst the stainless steel gauze was not affected. The ammonia was added so as to complex copper ions. Analysis was performed on Si, Al and Cu. Here, a Si/Al ratio of 107 and a Al/Cu ratio of 0.88 were found.

A sample comprising 0.995 wt. % ZSM-5 was analyzed on the basis of nitrogen adsorption measurements at 77 K with ASAP 2000M and Digisorb equipment (both marketed by Micromeretics USA) to characterize the pore system. ASAP 2000M measures in the micropore range (<2 nm) and is therefore very suitable for the characterization of zeolites. The sample to be analyzed was pretreated by heating it under vacuum at 637 K. After cooling to 77 K a $N_2$ isotherm was measured. The isotherm was transformed to a t-plot—where t represents the average thickness of the adsorbed $N_2$ layer— by converting the relative pressures ($p/p_0$) into t-values, utilizing the so-called conventional t-curve:

$$t=(13.9900/[0.0340-log(p/p_0)]^{0.5})$$

The micropore surface ($S_t$) and the micropore volume ($V_{micro}$) were determined by plotting the adsorbed volume against t. $S_t$ was calculated from the gradient and $V_{micro}$ was determined from the intercept of the curve with the Y axis. For these parameters, the following values were found; $S_t$=352 $m^2/g$ sieve crystal and $V_{micro}$=0.17 $cm^3$/g.

The BET surface ($S_{bet}$) was calculated after conversion of the $N_2$ adsorption isotherm into a BET plot. The difference between $S_{bet}$ and $S_t$ was designated as external surface ($S_{ext}$). For $S_{bet}$ a value of 435 was found and for $S_{ext}$ a value of 83 $m^2/g$ was found. Utilizing the Horvath-Kawazoe method, the micropore size distribution and the average pore diameter were determined. For this, a value of 0.5 nm was found.

Digisorb measurements were performed in the mesopore range (2–50 nm). After in vacuo heating of the sample to be analyzed at 673 K, an adsorption and a desorption isotherm were measured at 77 K. From the hysteresis found (less accurately, for that matter) the BET surface and the mesopore size distribution were determined. The BET surface was found to be 441 $m^2/g$, whilst the mesopores have diameters between 2 and 8 nm.

For the essentials of the techniques utilized in the characterization of the pores, reference is made to, for instance, Scholten J. J. F., Katalyse en Katalysatoren lecture notes, Delft University of Technology, Dpt. of Chemical Engineering, Delft (1989), pp. 93–121.

Example 4

Figure 2A:
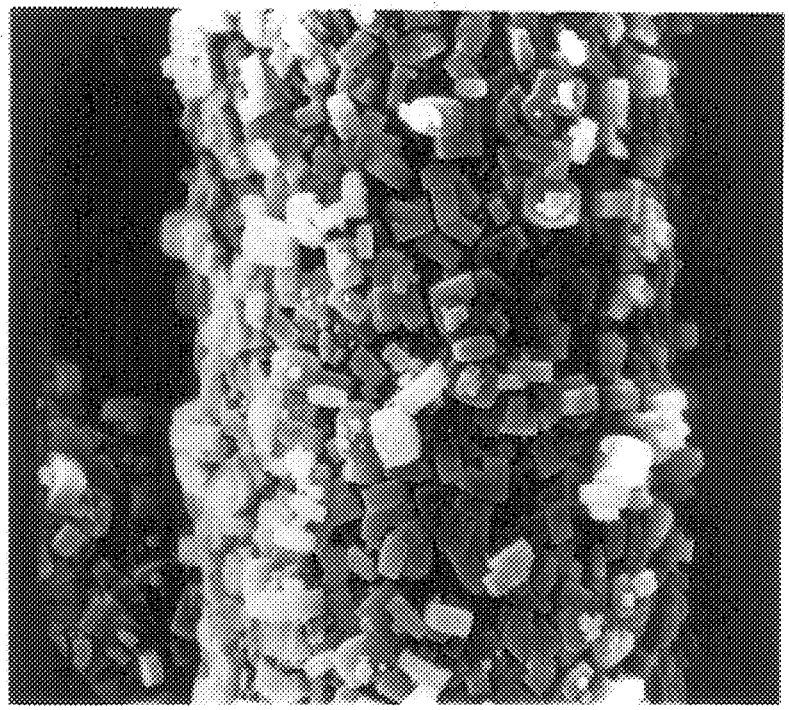
FIG. 2a is an electron microscope photograph of gauze coated with ZSM-5 crystals in accordance with the procedure described in example 4.
Figure 2B:
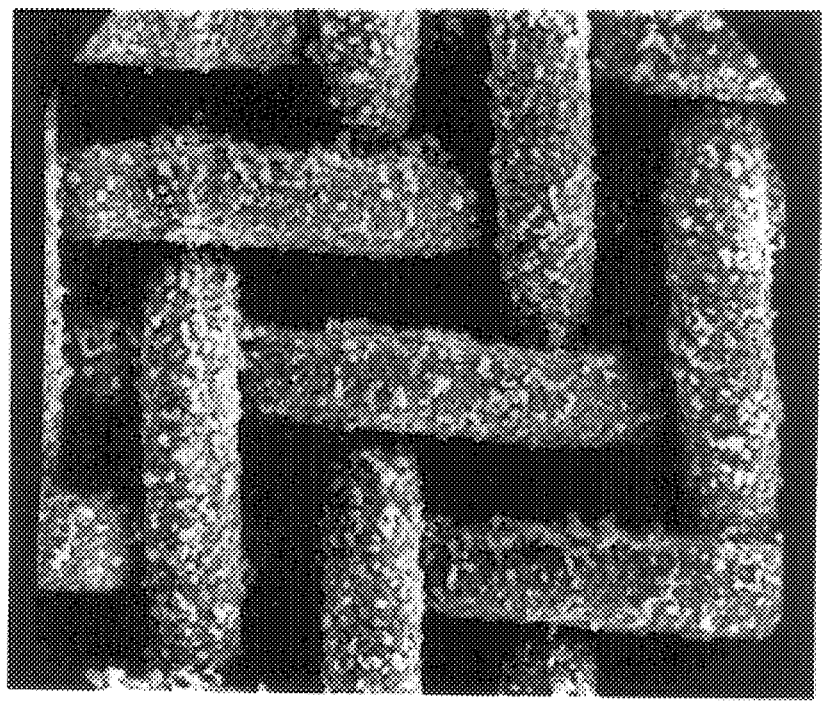
FIG. 2b is another electron microscope photograph of gauze coated with ZSM-5 crystals in accordance with the procedure described in example 4.

The method of the Examples 2 and 3 was repeated with 10 mole units TEOS, 1 mole unit TPAOH, 0.67 mole units $NaALO_2$ and 622 mole units of water. The catalyst system obtained in this manner is illustrated with reference to the electron microscope photographs shown in FIGS. 2a and 2b.

Example 5

Reduction of $N_xO_y$

A gas stream containing 14 vol. % water, 5 vol. % oxygen, 1000 ppm ammonia, 100 ppm nitrogen monoxide and the balance of nitrogen, was passed along a structured catalyst prepared according to Examples 1 through 3 at 350° C. and 1.1 bar. The catalyst was placed in an internal recirculation reactor, type RotoBerty. The contact time of the gas with the catalyst, expressed as the ratio between the mass of the sieve crystals in the reactor and the mass flow gas, was 2.7 seconds. Under these circumstances 75% of the nitrogen monoxide was selectively reduced with ammonia to nitrogen and water. Less than 1% of the ammonia in the feed stream was oxidized by oxygen.

These results show that the activity of the catalyst system according to the invention is equivalent to that of a silica-supported vanadium/titanium catalyst as described in European Patent Applications 0 265 590 and 0 217 446.

We claim:

1. A catalyst including a structured support having a layer of molecular sieve crystals chemically bound thereto, said layer being non continuous with the main axis of the crystals being chemically bound to the support at an angle of at least 45°, thereby allowing an open space to be present between the molecular sieve crystals in the direction of the support so that they are accessible to substances which are to be converted under the influence of the catalyst.

2. A catalyst system according to claim 1, characterized in that the molecular sieve crystals have a two-dimensional pore structure.

3. A catalyst system according to claim 1, characterized in that the molecular sieve crystals are of the type ZSM-5 and/or silicalite.

4. A catalyst system according to claim 1, characterized in that the molecular sieve crystals are oriented perpendicularly to the support surface.

5. A catalyst system according to claim 1, characterized in that the molecular sieve crystals have undergone an ion exchange with a transition metal.

6. A catalyst system according to claim 1, characterized in that the molecular sieve crystals are copper-, iron-, vanadium- or titanium-exchanged molecular sieve crystals.

7. A catalyst system according to claim 1, characterized in that the structured support is gauze.

8. A catalyst system according to claim 1, characterized in that the structured support comprises a shaped metal oxide material.

9. A catalyst system according to claim 8, characterized in that the structured support comprises stainless steel.

10. A reactor provided with a structured reactor packing, characterized in that the reactor packing is a catalyst system according to claim 1.

11. Method for the selective reduction of nitrogen oxides which comprises contacting a gas stream containing nitrogen monoxide with a compound having an NH group in the presence of a catalyst in accordance with claim 1, the nitrogen monoxide being selectively reduced to nitrogen and water.

12. Method for the selective reduction of nitrogen oxides which comprises contacting a gas stream containing nitrogen monoxide with a compound having an NH group in a reactor including a reactor packing comprising a catalyst system according to claim 10, the nitrogen monoxide being selectively reduced to nitrogen and water.

13. A method in accordance with claim 12 wherein the catalyst system includes a structured support comprising stainless steel.

* * * * *

UNITED STATES PATENT AND TRADEMARK OFFICE
CERTIFICATE OF CORRECTION

PATENT NO : 5,843,392

DATED : December 1, 1998

INVENTOR(S) : Jacobus Cornelis JANSEN et al

It is certified that error appears in the above-identified patent and that said Letters Patent is hereby corrected as shown below:

Title page, item
[75] Please correct the spelling of the inventors' names as follows:

Change "Hans Peter Alexander Galis" to --Hans Peter Alexander Calis--; and

Change "Henk Van Bekkum" to --Herman van Bekkum--.

Signed and Sealed this

Twenty-fourth Day of August, 1999

Attest:

Q. TODD DICKINSON

Attesting Officer

Acting Commissioner of Patents and Trademarks